No. 833,361. PATENTED OCT. 16, 1906.
J. T. WILMORE.
WAVE AND CURRENT ELECTRICAL GENERATOR.
APPLICATION FILED OCT. 23, 1905.

3 SHEETS—SHEET 1.

No. 833,361. PATENTED OCT. 16, 1906.
J. T. WILMORE.
WAVE AND CURRENT ELECTRICAL GENERATOR.
APPLICATION FILED OCT. 23, 1905.

3 SHEETS—SHEET 2.

Witnesses
Otto E Haddick
Dena Nelson

J. T. Wilmore,
Inventor
Attorney

No. 833,361. PATENTED OCT. 16, 1906.
J. T. WILMORE.
WAVE AND CURRENT ELECTRICAL GENERATOR.
APPLICATION FILED OCT. 23, 1905.
3 SHEETS—SHEET 3.
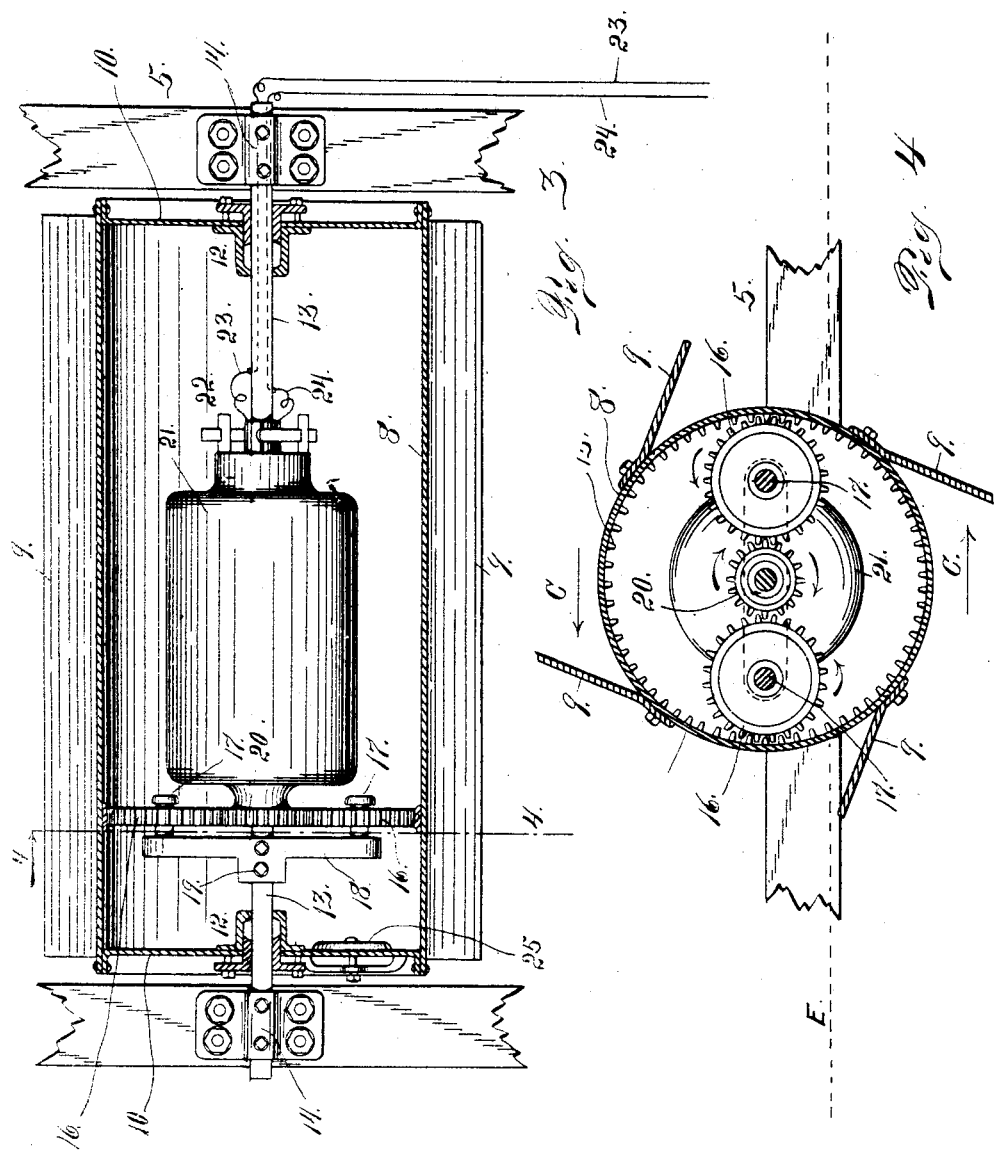

UNITED STATES PATENT OFFICE.

JOHN T. WILMORE, OF DENVER, COLORADO.

WAVE AND CURRENT ELECTRICAL GENERATOR.

No. 833,361.  Specification of Letters Patent.  Patented Oct. 16, 1906.

Application filed October 23, 1905. Serial No. 283,925.

*To all whom it may concern:*

Be it known that I, JOHN T. WILMORE, a citizen of the United States, residing in the city and county of Denver and State of Colorado, have invented certain new and useful Improvements in Wave and Current Electrical Generators; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to electrical generators adapted to be operated by the waves of the ocean or other large bodies of water or by the currents of rivers or flowing streams.

My object is to provide a thoroughly-practicable construction whereby electricity may be generated through the instrumentality of waves and currents, thus doing away entirely with the necessity for other power.

The invention will now be described in detail, reference being made to the accompanying drawings, in which is illustrated an embodiment thereof.

Figure 1:
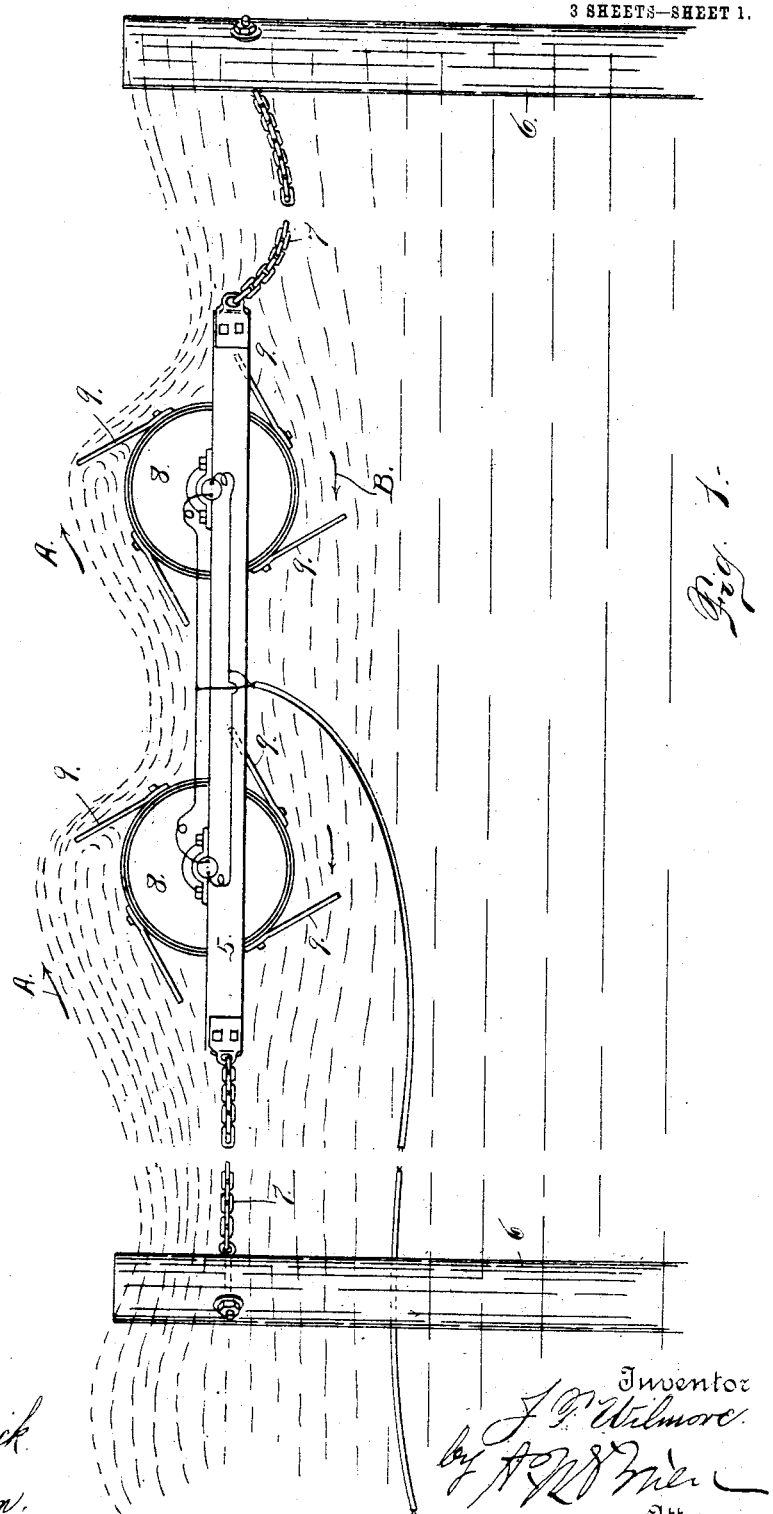
Figure 2:
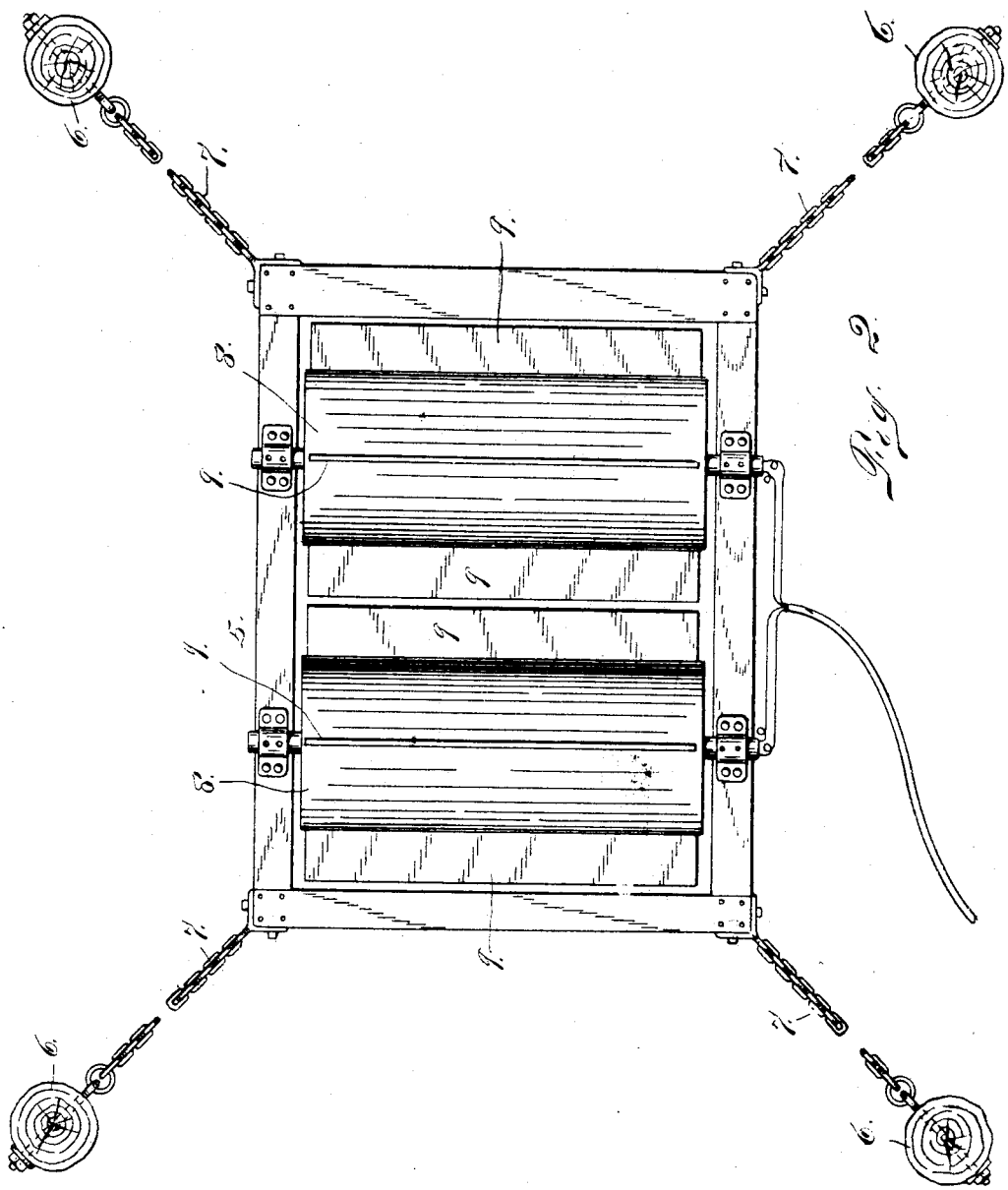

In the drawings, Figure 1 is a side elevation of my improved construction, illustrating its use as a wave-motor. Fig. 2 is a top or plan view of the construction as it would appear whether used as a wave or current motor. Fig. 3 is a sectional detail view taken through the rotary drum surrounding the field of the generator, the said drum being provided with blades or paddles to be acted on by the waves or currents. Fig. 4 is a section taken on the line 4 4, Fig. 3.

The same reference characters indicate the same parts in all the views.

Let the numeral 5 designate a suitable frame suspended from posts 6 through the instrumentality of chains or other suitable flexible devices 7. On this frame are mounted one or more drums 8, provided with blades or paddles 9, projecting from their exterior surface. In the drawings two of these drums are illustrated. It is evident that the scope of the invention is sufficiently broad to cover one or more drums. These drums are provided with heads 10 and stuffing-boxes 12, surrounding the armature-shaft 13, the said shaft being stationary in boxes 14, secured to the frame. The drums are thus revolubly mounted upon the armature-shaft and free to rotate therearound in response to the action of the waves or currents.

As shown in the drawings, the drum is provided interiorly with a cogged zone or gear 15, which meshes with two gears 16, journaled on stub-shafts 17, mounted on a support 18, made fast to the shaft 13 by bolts 19. The two gears 16 engage a third gear 20, fast on the field 21 of the generator, the field being mounted to rotate about the armature. A commutator 22 is also fast on the armature-shaft and from it lead conductors 23 and 24, which pass through the armature-shaft and may be connected with a motor or motors located at any desired distance from the generator or generators.

From the foregoing description it will be understood, referring now more especially to Fig. 1 of the drawings, that when the apparatus is so located that it is accessible to the ocean waves the upper part of the wave will act upon the paddles or blades, as indicated by the arrows A in Fig. 1, on the upper part of the drum, while the undertow or reverse current, as indicated by the arrows B in the same figure, will act on the blades or paddles on the lower part of the drum. In this way the two movements of the water in reverse directions are simultaneously utilized for propelling the drum.

As the drum is rotated in the direction indicated by the arrows C in Fig. 4 the field 21 is rotated in the reverse direction, as indicated by the arrow D in the same figure. This movement of the armature is obtained through the instrumentality of the gears 16, meshing with the gear 20, the gears 16 being actuated by the gear 15 of the rotating drum. During this operation it is evident that a current of electricity will be generated and may be taken from the commutator of the armature and carried through the instrumentality of the conductors to any desired distance, where it may be utilized for doing work of any kind.

When the device is used as a current-motor, it will be only partially submerged in the stream. In this case the water-level is indicated by the dotted line E in Fig. 4. When the device is used in this manner, the lower arrow C in Fig. 4 may indicate the direction of the current which acts only upon the paddles or blades on the lower part of the drum, the upper blades being above the surface of the water. The operation of the device in this case is exactly the same as that illustrated in Fig. 1, except that the blades or paddles are not all simultaneously utilized.

It must be understood that the conductors 23 and 24 are suitably insulated. Attention is also called to the fact that one extremity of the drum is provided with a sort of manhead 25 to permit access to the interior mechanism. By virtue of excluding the water from the revoluble drum the latter is made sufficiently buoyant to float. Therefore there is practically no strain upon the flexible devices 7 except such as is necessary to maintain the apparatus in a constant position or location upon the surface of the water.

Having thus described my invention, what I claim is—

1. In a wave or current electrical generator, the combination with a frame suitably supported, and an electrical generator mounted on the frame and located to be acted upon by the waves or currents of a body of water, the said generator being provided with a rotating drum having exteriorly-projecting blades whereby rotary action is imparted to the drum for the purpose set forth.

2. In apparatus of the class described, the combination of a frame, suitable stationary supports, flexible devices for connecting the frame with the stationary supports, an electrical generator mounted on the frame and comprising a rotary drum, an armature, the drum being revoluble on the armature-shaft and provided with blades to be acted on by the wave or current to produce rotary motion, a field mounted to rotate on the armature-shaft, a gearing connection between the drum and field, the armature-shaft being stationary and the gearing being such that the drum and field are rotated in reverse directions, substantially as described.

3. In apparatus of the class described, the combination of an electrical generator including a rotary drum revolubly suspended to be acted on by the wave or current of a body of water, the said drum being provided with blades or paddles for producing rotary motion, an armature having a stationary shaft, a field revoluble on the shaft, and a gearing connection between the drum and field whereby the two instrumentalities are simultaneously rotated.

4. In apparatus of the class described, the combination of a revolubly-suspended drum located to be acted on by the waves or currents of a body of water, the said drum being provided with blades or wings, electrical generating mechanism inclosed by the drum and a suitable operative connection between the drum and generating means.

5. In apparatus of the class described, the combination of a suspended drum revolubly mounted and located to be acted on by the waves or currents of a body of water, the exterior construction of the drum being such as to cause its rotation under the influence of the said waves or currents, electrical generating mechanism inclosed by the drum and formed sufficiently tight to exclude the water, and a suitable operative connection between the drum and the said generating mechanism.

6. In mechanism of the class described, the combination of a buoyant receptacle, suitable means for maintaining the same in position upon the surface of the water, the said receptacle being revolubly mounted and constructed to be rotated by the action of waves or currents, electrical generating means inclosed by the said receptacle, and a suitable operative connection between the revoluble receptacle and the inclosed generating means.

In testimony whereof I affix my signature in presence of two witnesses.

JOHN T. WILMORE.

Witnesses:
 DENA NELSON,
 OTTO E. HODDICK.